United States Patent [19]
Makimoto et al.

[11] 4,016,568
[45] Apr. 5, 1977

[54] METHOD AND SYSTEM FOR MEASURING DOPPLER FREQUENCY SHIFT OF AN ECHO

[75] Inventors: Mistuo Makimoto; Sadahiko Yamashita, both of Kawasaki; Yoshiharu Yano; Junichi Yamamoto, both of Yokohama, all of Japan

[73] Assignee: Matsushita Electric Industrial Co., Ltd., Japan

[22] Filed: Dec. 31, 1974

[21] Appl. No.: 537,767

[30] Foreign Application Priority Data

Jan. 18, 1974  Japan ................. 49-8896

[52] U.S. Cl. .................................................. 343/8
[51] Int. Cl.² ........................................... G01S 9/44
[58] Field of Search .......................................... 343/8

[56] References Cited
UNITED STATES PATENTS

| | | | |
|---|---|---|---|
| 2,524,610 | 10/1950 | Storm et al. | 343/8 |
| 3,034,049 | 5/1962 | Downs | 343/8 |
| 3,056,128 | 9/1962 | Ball et al. | 343/8 X |
| 3,365,716 | 1/1968 | Jorgensen | 343/8 |
| 3,373,428 | 3/1968 | Atlas | 343/8 |

Primary Examiner—Malcolm F. Hubler
Attorney, Agent, or Firm—Robert E. Burns; Emmanuel J. Lobato; Bruce L. Adams

[57] ABSTRACT

A beam of diverging electromagnetic radiation of a predetermined frequency is transmitted to a target and the doppler shift of frequency of an echo due to relative movement of the target and a point of reception is detected conventionally by combining the frequency of the echo and the predetermined frequency. The number of cycles within the detected doppler shift frequency is counted to provide a delay to initiate measurement of doppler shift at a preselected angle of incidence of the echo. The effective area of measurement is thus restricted to a narrow region of the beam with the resultant high degree of precision.

10 Claims, 4 Drawing Figures

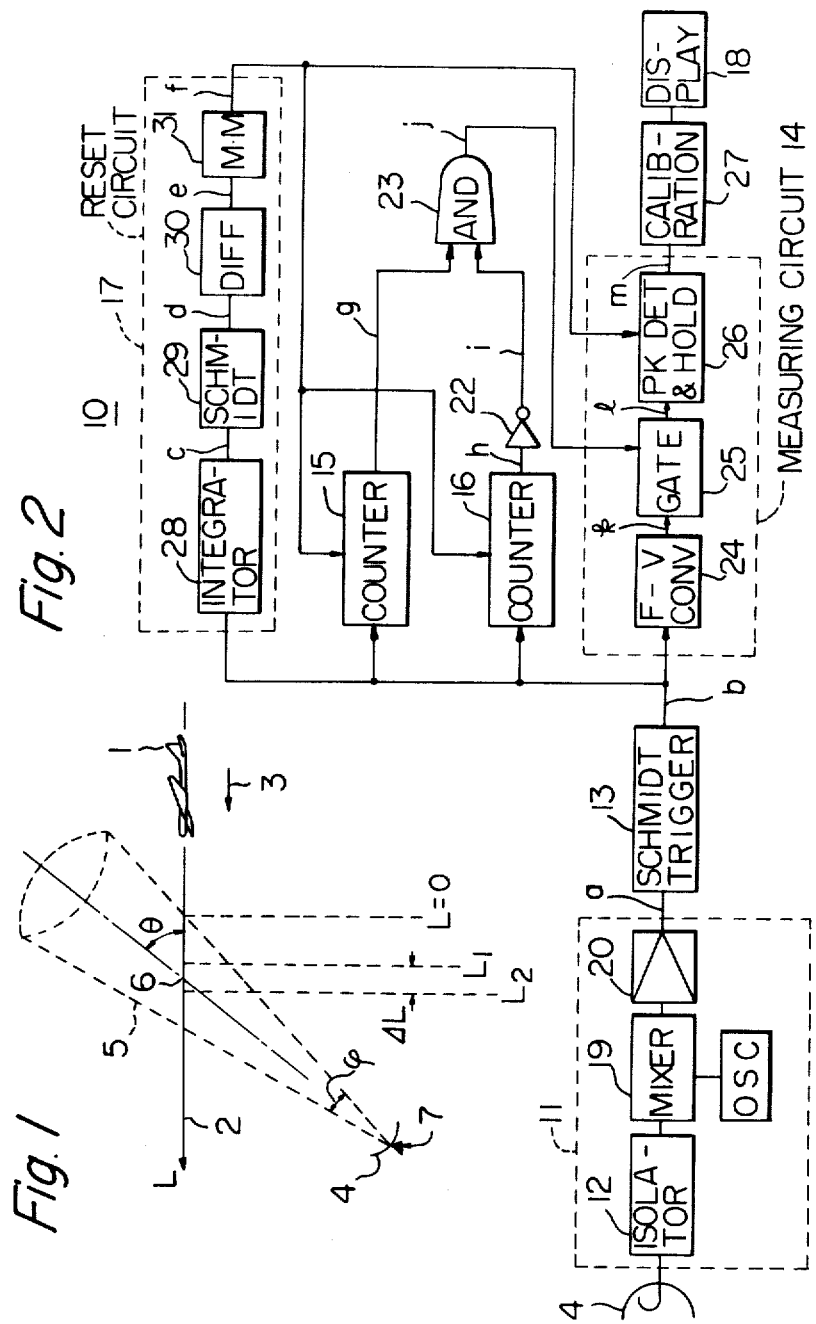

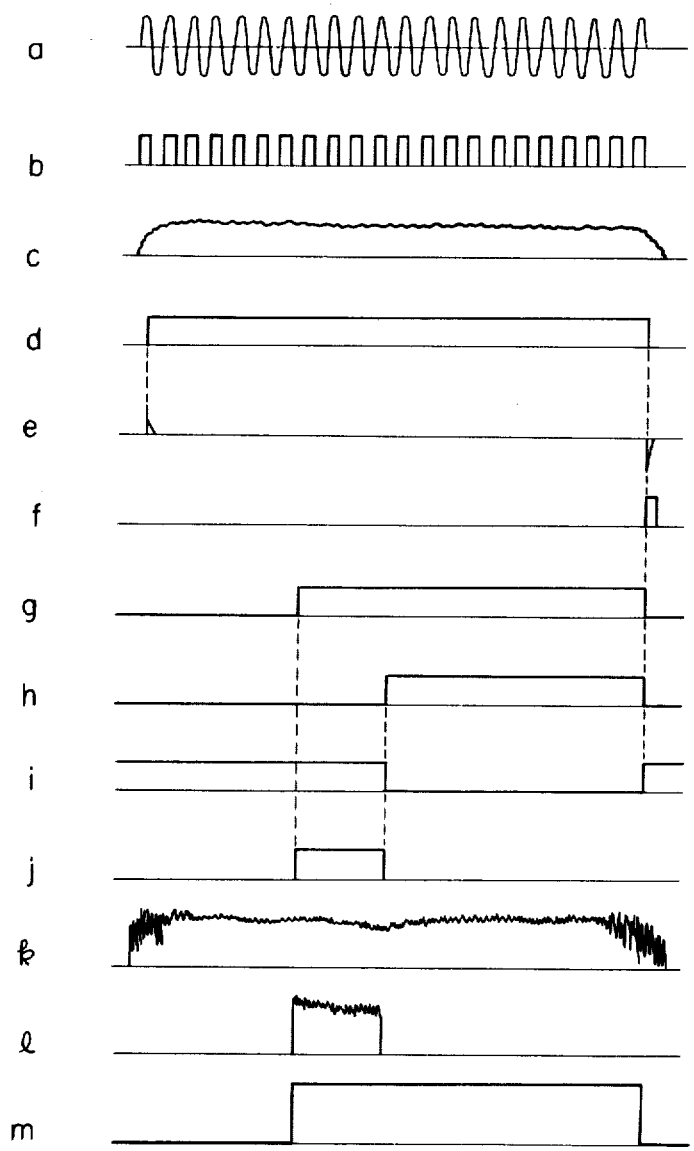

METHOD AND SYSTEM FOR MEASURING DOPPLER FREQUENCY SHIFT OF AN ECHO

BACKGROUND OF THE INVENTION

The present invention relates generally to radar systems, and more particularly to a method for measuring the doppler shift of frequency of an echo due to relative movement of a target and a point of reception of the echo, and a system embodying the method.

The fact that the relative movement of a target and a radar system can be determined by transmitting a beam of electromagnetic radiation of a predetermined frequency, usually in the microwave region, toward the target and measuring the deviations in frequency of an echo from the predetermined frequency is well known in the art. The doppler shift of frequency is an extreme fraction of the transmitted frequency which is a function of the angle made between the direction of propagation of the beam and the direction of movement of the target. Where the beam diverges as it propagates toward the target, the angle it makes with the direction of propagation will vary with time as the target advances. The signal intensity of a received echo arising at the detectable fringe areas of the diverging beam is much weaker than in the intermediate portion of the beam, and thus the doppler shift frequency will violently fluctuate due to possible interfering noise which occurs as the target is about to enter and leaves the fringe areas. The use of a larger diameter antenna may provide a narrow beam of strong intensity to obviate such difficulty only with the consequential increased cost. In addition, it is difficult to compensate for the varying angle for measurement of doppler shift and consequently an error will be introduced into the measurement if no appropriate compensation is made.

SUMMARY OF THE INVENTION

Therefore, an object of the present invention is to provide an improved method and system for measuring doppler shift of frequency of an echo with a high degree of precision while using a small diameter antenna to take advantage of its economy.

Another object of the invention is to provide a method for selecting a desired portion of the echo which occurs as a result of the target traversing an intermediate portion of the transmitted beam and allowing the measurement of the selected portion of the echo to be made.

A further object of the invention is to provide a method in which the number of cycles of the doppler shift of frequency is counted to utilize the intermediate portion of the echo to determine the relative velocity of the target and the radar system.

Briefly, there is provided a doppler radar system of the type which transmits a beam of electromagnetic radiation of a predetermined frequency in the microwave to submillimeter wave regions to a target. A conventional parabolic antenna of a small aperture type may be employed, to take advantage of its economy, to provide emission of a diverging beam. The radar system detects the doppler shift of frequency of an echo due to the relative movement of the target and the system by combining or mixing the frequency of the echo and the predetermined frequency. The method of the invention for measuring the doppler shift of frequency utilizes the fact that the number of cycles present in the detected doppler shift of frequency is not a function of the relative velocity of the target and the radar system, so that an intermediate portion of the echo that arrives in a finite period of time as the target traverses the beam is selected by counting the number of cycles. In accordance with the invention, a desired controllable delay which is independent of the relative velocity is provided between reception of echo and the start of measurement of doppler shift using a first and a second delay counter which are reset at the end of the reception of the echo. These counters define the start and end of the measurement to restrict it to a fraction of the echo that occurs as a result of the target passing through the corresponding limited region of the beam. Since the angle which is made between the direction of propagation and the direction of movement varies to a lesser degree for the limited portion of echo which occurs in a narrower region of the beam than it varies between the minimum and maximum angles which it makes in the detectable fringe areas of the beam, and the delay may be preset at any angle of the beam, the doppler shift measurement is made possible with a higher degree of precision than is available with the prior art by calibrating the obtained result with the preset angle.

BRIEF DESCRIPTION OF THE DRAWINGS

These and other objects and advantages of the invention will be understood from the following description taken in conjunction with the accompanying drawings, in which:

FIG. 1 is a schematic view useful for describing the principle of the present invention;

FIG. 2 is a schematic circuit diagram of a preferred embodiment of the invention;

FIG. 4 is a graph illustrating various signal waveforms appearing in the circuits of FIG. 2.

DESCRIPTION OF THE PREFERRED EMBODIMENTS

Figure 3:
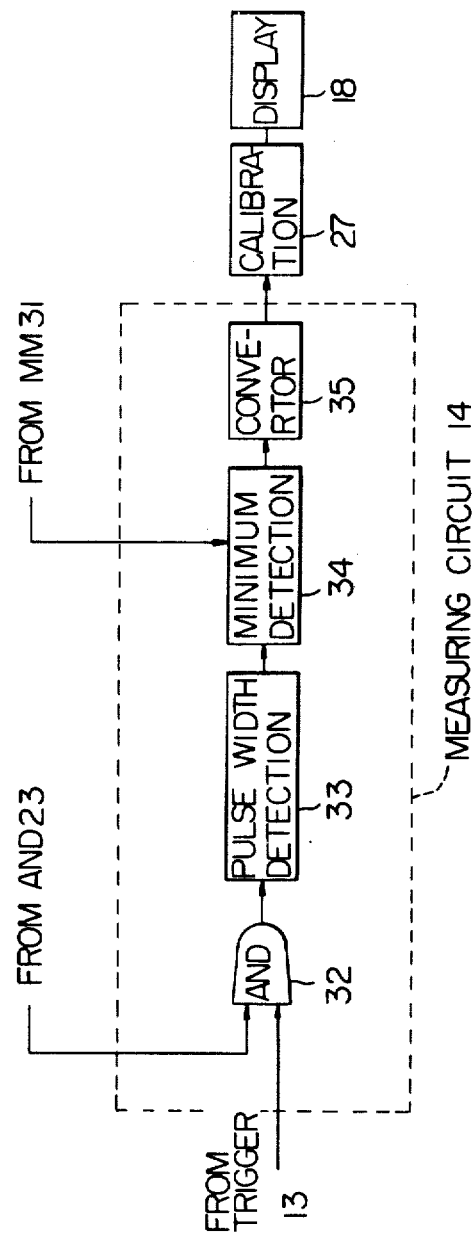
FIG. 3 is a schematic circuit diagram of a modified form of the embodiment of FIG. 2.

Referring now to the drawings, particularly to FIG. 1 wherein the principle of the present invention is schematically shown. An object or target 1 is assumed to move in the direction of arrow 3 along a straight path 2. A radar antenna 4 is located relative to the target and transmits a beam of electromagnetic radiation of a predetermined frequency usually in the microwave region with an angle of divergence $\phi$, the center axis of the beam intersecting the path 2 at point 6 at an angle $\theta$. When the target 1 enters the detectable range of the electromagnetic radiation 5, the target 1 reflects the radiation as an echo to the antenna 4 which detects the doppler frequency shift in the target echo which is proportional to the radial component of target velocity. The doppler frequency shift $\Delta f$ is an extremely small fraction of the transmitted frequency $f$. It is given by the equation below, where V is the relative speed, C is the speed of propagation of electromagnetic radiation, and A is the angle between the direction of movement of the target 1 and the direction of propagation.

$$\Delta f = (2Vf/C) \cdot \cos A$$

Since the transmitted beam has an angle of divergence $\phi$, the angle A ranges from $\theta - \phi/2$ to $\theta + \phi/2$. Therefore, it is seen that the doppler frequency shift varies with time as the target 1 traverses the beam 5 between the maximum and minimum values which are given by the following equations.

$$\Delta f_{max} = (2Vf/C) \cos(\theta - |\phi/2|)$$

$$\Delta f_{min} = (2Vf/C) \cos(\theta + |\phi/2|)$$

Therefore, an error will be introduced into the detected velocity since it is difficult to compensate for the varying angles between the direction of relative movement and the direction of propagation of electromagnetic radiation.

In accordance with the invention, the angle of divergence of beam is equivalently reduced by an electronic circuit by restricting the measurement of doppler shift frequency to a portion of echo that occurs within a limited angle of divergence. Assume that the target 1 have traversed the beam 5 as long as the distance $L_1$ (FIG. 1), the time it takes to travel that distance is $L_1/V$ and the number of cycles ($N_1$) of the detected doppler shift of frequency as target 1 travels distance $L_1$ is given by the following equation.

$$N_1 = (L_1/V)(2Vf/C)\cos\theta = (2L_1f/C)\cos\theta$$

Likewise, the number of cycles ($N_2$) of the doppler shift of frequency as the target travels distance $L_2(=L_1 + \Delta L)$ is given by the following equation.

$$N_2 = \frac{2(L_1 + \Delta L)f}{C}\cos\theta$$

Therefore, the number of cycles ($\Delta N$) that occur as the target travels a fraction of distance $\Delta L$ is given by $$\Delta N = N_2 - N_1 = \frac{2\Delta Lf}{C}\cos\theta$$

Therefore, it is seen that the number of cycles is independent of the velocity of the moving target and that a desired portion of echo can be selected by counting the number of cycles of the detected doppler shift, initiating the doppler shift measurement upon counting of $N_1$ and ceasing the measurement upon counting of $N_2$. Therefore, the measurement of doppler frequency shift is confined to a selected narrow region of echo to thereby diminish the possible error.

In FIG. 2 there is shown a receiver section 10 of a doppler radar system 7 embodying the invention which generally comprises a conventional doppler shift detecting current 11 which is adapted to receive an input echo signal via a receiving antenna 4, a Schmidt trigger circuit 13, a doppler shift measuring circuit 14 which measures the doppler frequency shift due to relative movement of the target 1 and the antenna 4, first and second counters 15 and 16, a reset circuit 17 and a display device 18. An echo will be produced as long as the target 1 traverses the beam 5 along path 2, and the echo is received by the antenna 4 and applied to an isolator 12 which provides loss much greater in one direction of signal than in the opposite direction. A mixer 19 combines the received echo signal with the signal of a local oscillator 21 to produce a beat frequency which is the difference in frequency between the two signals and amplified by amplifier 20. As is well known in the art, the beat frequency or Doppler signal is representative of the doppler shift of frequency and is usually in the range much lower than the frequency of the signal received (FIG. 4a). The Schmidt trigger circuit 13 is connected to the output circuit of the mixer 19 to convert the input signal into a train of pulses or Doppler signal (FIG. 4b). The counter 15 is connected to the output circuit of Schmidt trigger circuit 13 to count the number of pulses derived from Schmidt trigger circuit 13 to produce an output when a predetermined number of pulses $N_1$ as referred to above is counted (FIG. 4g). The counter 16 is also connected to the output circuit of Schmidt trigger circuit 13 to count the pulses to produce an output when a predetermined number of pulses $N_2$ is counted (FIG. 4h). The output from counter 16 is inverted by an inverter 22 and combined with the output from counter 15 in the And gate 23 which produces an enable signal or detection interval selection signal (FIG. 4j) which will be applied to the measuring circuit 14. The measuring circuit 14 comprises a frequency-to-voltage converter 24 which detects the instantaneous frequencies of the detected doppler signal and converts them into a voltage signal varying in amplitude proportional to the instantaneous frequency (FIG. 4k). Since the leading edge portion of the echo that arrives first and the trailing edge portion of the echo that arrives last at the receiving antenna are much weaker in signal intensity than the intermediate portion of the echo, the signal at the start and end of reception will be severely affected by interfering noise and fluctuate violently in frequency as indicated. The voltage signal is then applied to a gate circuit 25 to which the enable pulse derived from And gate 23 is also applied to pass the voltage signal that lies in the intermediate portion of the entire echo to a peak detector and hold circuit 26 which detects the maximum value of the voltage signal to be displayed by a display device 18. The signal is maintained until it is cleared by a reset pulse which will be described later for ease of reading the data displayed. An angle calibration circuit 27 is connected to the output circuit of peak detector 26 to compensate for the angle at which the fraction of echo arrives at the receiving antenna. Since the number cycles of the doppler shift frequency, or the number of pulses derived from the Schmidt trigger circuit 13 is independent of the velocity of the moving target 1, the approximate angle of the detected peak signal is determined by counting of a predetermined number of pulses and the signal obtained at the output of the peak detector 26 is calibrated by the angle of the detected signal to provide a high degree of precision.

The reset circuit 17 comprises an integrating circuit 28 which detects the direct-current component (FIG. 4c) of the pulses derived from the Schmidt trigger circuit 13, a second Schmidt trigger circuit 29 which produces a single rectangular pulse (FIG. 4d) in response to the output level of the integrator 28, a differentiating circuit 30 which differentiates the rectangular pulse producing a sharp positive pulse at the rising edge of the applied pulse and a sharp negative pulse at the falling edge of the pulse (FIG. 4e) and a monostable multivibrator 31 which produces a reset pulse in response to the negative-going pulse. The reset pulse is used to clear the counters 15 and 16 and the peak detector and hold circuit 26 for subsequent reading.

Although the peak detector 26 may be replaced with an averaging circuit or a minimum level detector, the use of peak detector is preferred because the doppler frequency shift is an extremely small fraction of the transmitted frequency as described above.

The doppler shift measuring circuit 14 may be modified as shown in FIG. 3 in which it comprises an And gate 32 connected to the Schmidt trigger circuit 13 to pass the output therefrom to a pulse-interval detecting circuit 33 which converts the period of each cycles of the detected doppler shift into a digital quantity which is then applied to a minimum value detecting and hold circuit 34 which detects the minimum value of the digital quantity. The circuit 34 may be constructed of a comparator circuit which detects the minimum value in comparison of a reference value and a memory device which stores the detected value in memory. Since the detected value is inversely proportional to the velocity of the moving target, a convertor 34 is provided to convert the detected minimum value into a maximum value to indicate the relative velocity.

In like manner, the enable pulse derived from And gate 18 is applied to And gate 32 to pass the signal from Schmidt trigger circuit 13 to allow the measurement of doppler shift during a portion of the echo which occurs as a result of the target 1 traversing a limited portion of the beam 5, thereby cutting off portions of echo which arise at or near the start and end of reception of echo as the target enters and leaves the detectable range of the beam 5.

The memory unit of the circuit 34 is cleared by the reset pulse from the reset circuit 17 for subsequent reading of the data.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A method of measuring a velocity of a moving object, comprising the steps of:
   transmitting a diverging beam of electromagnetic radiation in a direction so that the moving object traverses the beam of electromagnetic radiation;
   receiving electromagnetic radiation reflected from the moving object, which electromagnetic radiation has an instantaneous Doppler frequency component that varies in frequency as a function of time as the moving object traverses the beam of electromagnetic radiation;
   detecting the Doppler frequency component of the reflected electromagnetic radiation to develop an oscillatory Doppler signal oscillating at the Doppler frequency;
   counting a predetermined number of the oscillations of the Doppler signal after the Doppler frequency component is first detected; and
   detecting the maximum frequency of the Doppler oscillations which occur after the predetermined number of Doppler oscillations have been counted, which maximum frequency is representative of a velocity of the moving object.

2. A method as claimed in claim 1, wherein detecting the maximum frequency converting the oscillatory Doppler signal into an analog signal having a magnitude proportional to to Doppler frequency; and detecting the maximum magnitude of the analog signal.

3. A method as claimed in claim 1, wherein detecting the maximum frequency comprises converting the interval between successive ones of the oscillations of the Doppler signal into a digital signal; and detecting the minimum of the digital signal.

4. In a Doppler radar of the type including transmitting means for transmitting a diverging beam of electromagnetic radiation in use toward a moving object; receiving means for receiving electromagnetic radiation reflected from the moving object which reflected electromagnetic radiation has an instantaneous Doppler frequency component which varies in frequency as a function of time as the moving object traverses the beam of electromagnetic radiation, said receiving means including Doppler frequency detecting means for detecting the instantaneous Doppler frequency of the reflected electromagnetic radiation and for developing an oscillatory Doppler output signal oscillating at the Doppler frequency; the improvement which comprises: counting means for counting a predetermined number of the Doppler signal oscillations and for developing a detection interval selection signal after the predetermined number of Doppler signal oscillations are counted; gating means connected to receive the Doppler signal oscillations and responsive to the detection interval selection signal for gating the Doppler signal oscillations to pass the Doppler signal oscillations during the occurrence of the detection interval selection signal and to block passage of the Doppler signal oscillations in the absence of the detection interval selection signal; and detecting means for detecting the maximum frequency of the Doppler signal oscillations passed through said gating means and for developing a velocity-representative signal representative of the velocity components of the velocity of the moving object which caused the Doppler frequency shift of the reflected electromagnetic radiation.

5. In a Doppler radar as claimed in claim 4, wherein said counting means comprises a first counter for counting the Doppler signal oscillations to provide a start signal when the predetermined number of Doppler signal oscillations are counted; a second counter for counting the Doppler signal oscillations to provide a stop signal when a second predetermined number of Doppler signal oscillations are counted; and logic gate means connected to the first and second counters for producing said detection interval selection signal having a duration from the occurrence of the start signal until the occurrence of the stop signal.

6. In a Doppler radar as claimed in claim 5, further comprising resetting means for resting the first and second counters at the instant said moving object has completed traversing the beam of radiated electromagnetic energy.

7. In a Doppler radar as claimed in claim 6, wherein said resetting means comprises an integrator receptive of the Doppler signal oscillations to integrate the magnitude of the oscillations; a Schmitt trigger circuit connected to the integrator to provide an output pulse in response to the integrated output from the integrator, which output pulse has a duration for the period during which Doppler signal oscillations are developed; and a differentiator connected to the Schmitt trigger circuit to apply the Schmitt circuit output pulse to the differentiator for developing a reset signal at the trailing edge of the Schmitt circuit output pulse which is applied to reset said first and said second counters.

8. In a Doppler radar as claimed in claim 4, wherein said detecting means comprises means for converting the Doppler signal oscillations into an analog signal having a magnitude proportion to Doppler frequency; and peaks detecting and holding means for detecting the maximum magnitude of the analog signal and for holding the detected maximum magnitude.

9. In a Doppler radar as claimed in claim 8, wherein said peak detecting and holding means comprise means for resetting the same, and further comprising means for applying the reset signal developed by said resetting means to said means for resetting and holding means at the instant said moving object has completed tranversing the beam.

10. In a Doppler radar as claimed in claim 6, wherein said detecting means comprises means for converting the interval between successive ones of the Doppler oscillations into a digital signal; and means for detecting the minimum of the digital signal.

* * * * *